(12) United States Patent
Kimminau

(10) Patent No.: US 6,498,890 B1
(45) Date of Patent: Dec. 24, 2002

(54) CONNECTOR CABLE FOR CONNECTING BETWEEN AN OPTICAL CABLE AND MULTIPLE DEVICES

(75) Inventor: Michael D. Kimminau, Security, CO (US)

(73) Assignee: LSI Logic Corporation, Milpitas, CA (US)

( * ) Notice: Subject to any disclaimer, the term of this patent is extended or adjusted under 35 U.S.C. 154(b) by 8 days.

(21) Appl. No.: 09/897,578

(22) Filed: Jul. 2, 2001

(51) Int. Cl.[7] .................................................. G02B 6/00
(52) U.S. Cl. ....................................... 385/134; 439/502
(58) Field of Search ...................... 439/61, 502; 385/24, 385/53, 134–137; 395/309, 281

(56) References Cited

U.S. PATENT DOCUMENTS 5,461,693 A * 10/1995 Pimpinella .................. 385/135
5,488,705 A * 1/1996 LaBarbera ................... 395/309
6,174,196 B1 * 1/2001 Pongracz et al. ........... 439/502

* cited by examiner

Primary Examiner—Brian Sircus
Assistant Examiner—Son V. Nguyen
(74) Attorney, Agent, or Firm—John R. Ley, LLC

(57) ABSTRACT

The subject matter described herein involves a connector cable, particularly for use in a computerized storage system, such as Fibre Channel. The connector cable generally connects together a storage device, a power supply and an optical cable through which optical signals are transferred. A media interface adapter connects between the connector cable and the optical cable and receives electrical power from the power supply through the connector cable to convert the optical signals to electrical signals and vice versa. Using a plurality of the connector cables with or without a connection to the power supply, a plurality of the storage devices may be chained together.

10 Claims, 3 Drawing Sheets

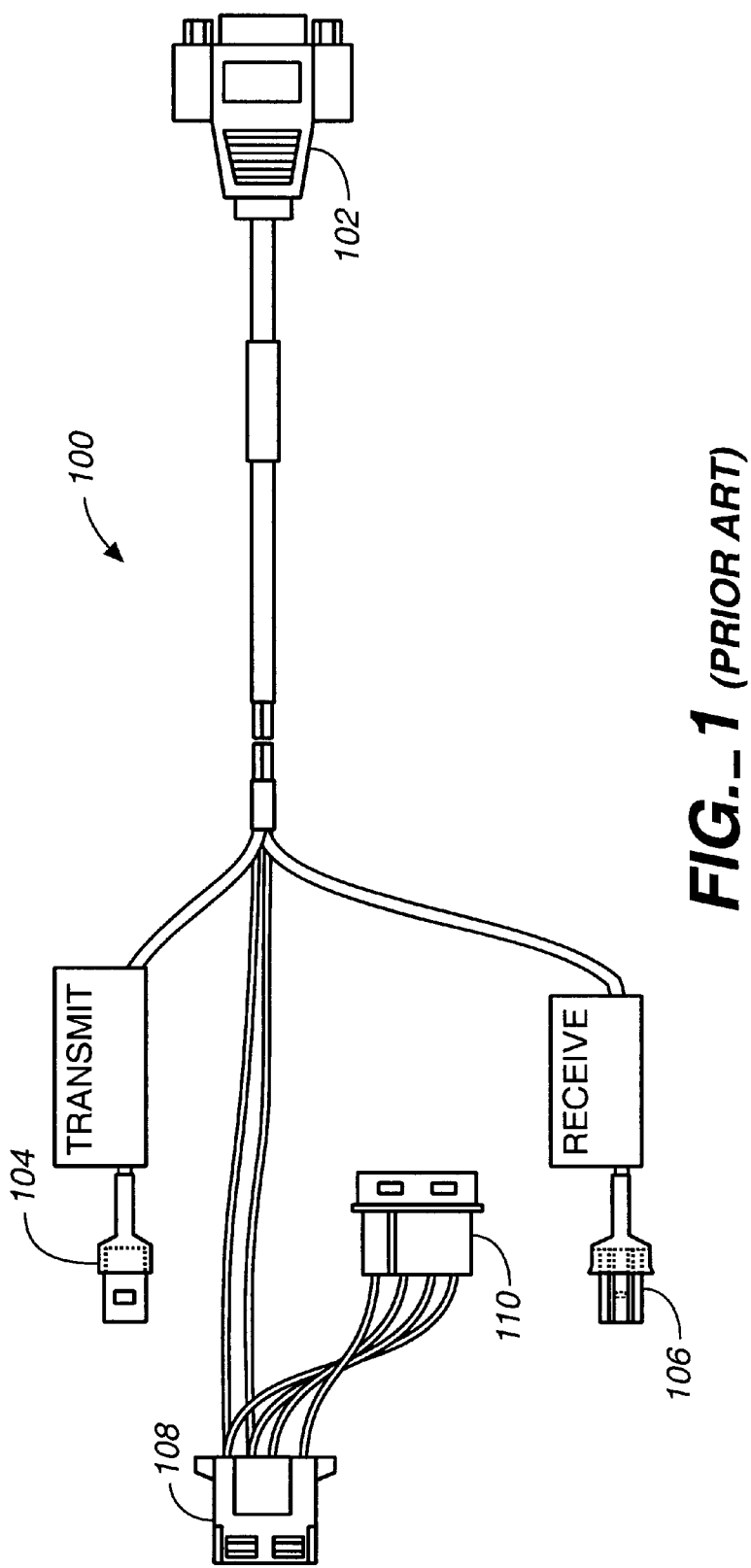
FIG._1 (PRIOR ART)

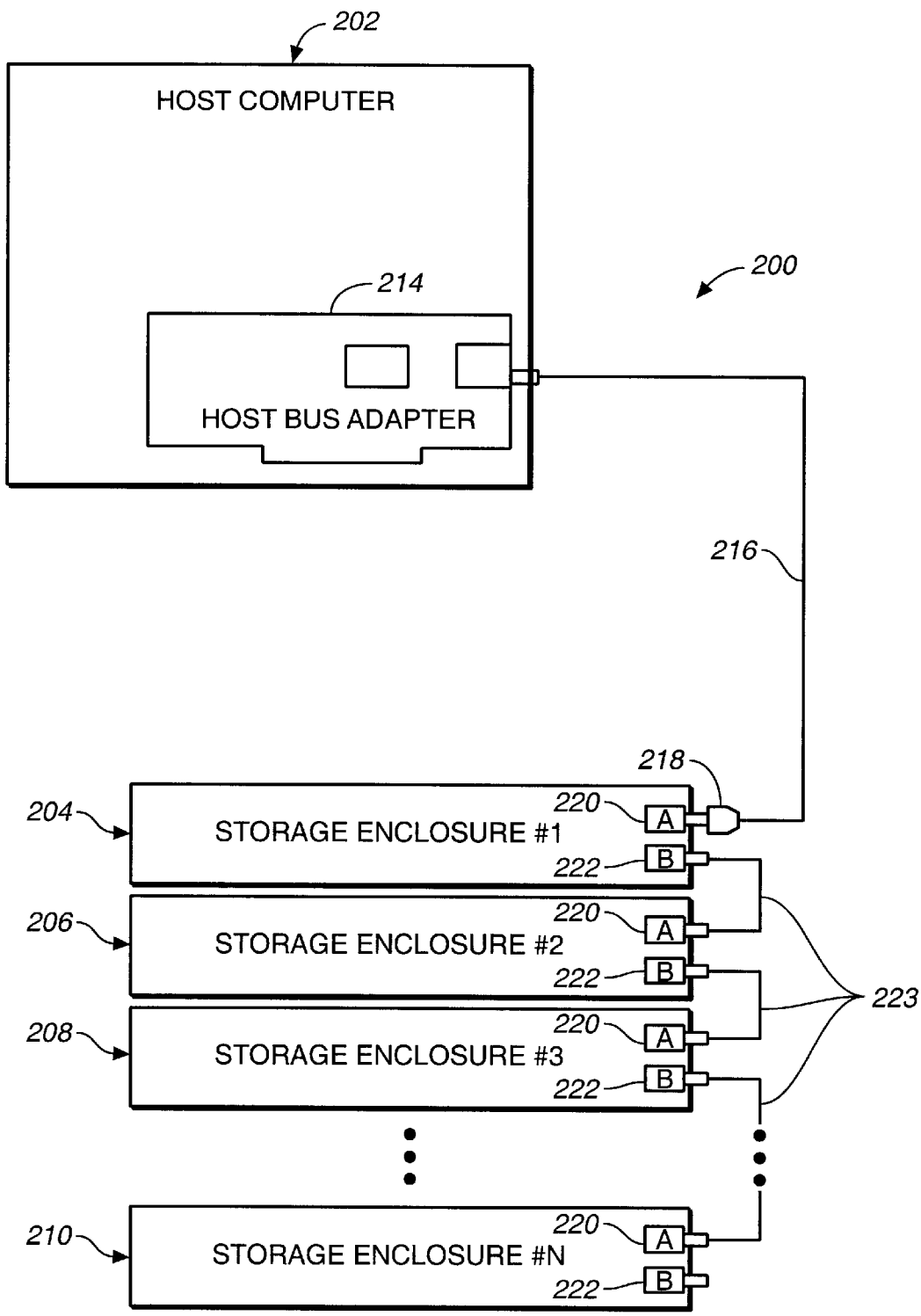
FIG._2

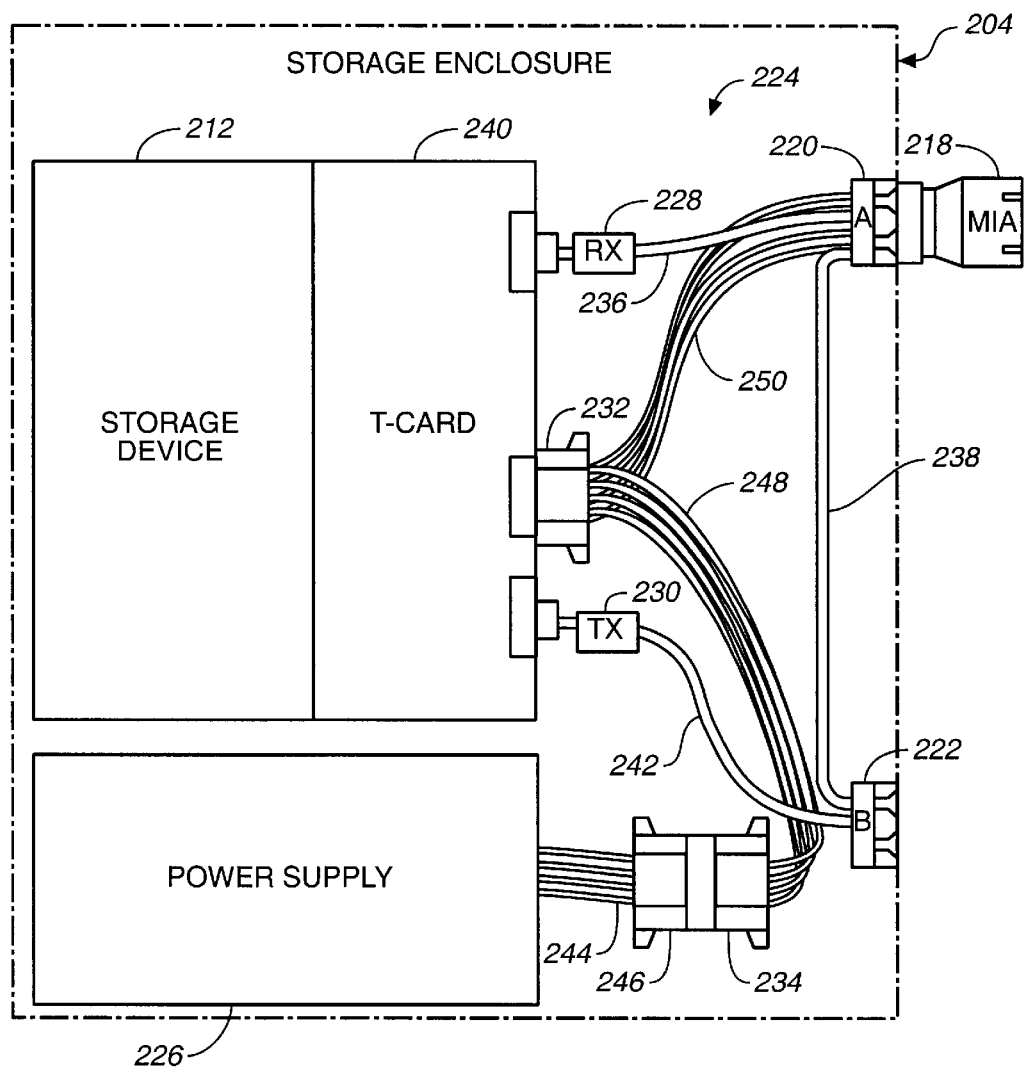
FIG._3
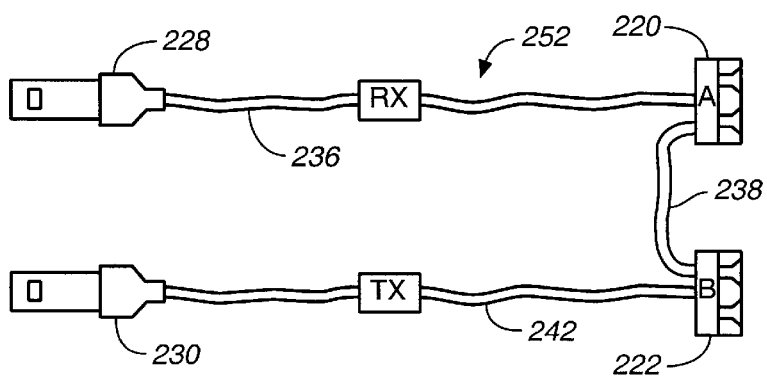
FIG._4

CONNECTOR CABLE FOR CONNECTING BETWEEN AN OPTICAL CABLE AND MULTIPLE DEVICES

FIELD

The subject matter herein relates to connections between optical and electrical devices.

BACKGROUND

In computerized storage systems, it is often necessary to connect one or more storage devices to a host computer, such as a storage server. In a Fibre Channel system, for example, the host computer commonly connects through a fiber optic cable to the storage devices. The host computer typically sends optical signals through the fiber optic cable to the storage devices, where the optical signals are converted into electrical signals for transfer through common wiring, such as copper wires, to the storage devices. The storage devices are commonly connected in a group referred to as a "JBOD" (Just a Bunch Of Disks). Typical JBODs have up to eight storage devices connected to a "backplane," which connects to the fiber optic cable. Thus, the JBODs are limited in the number of storage devices that can be connected together.

For connecting a single storage device through the fiber optic cable to the host computer at a 1-Gbit/sec transfer rate, a connector cable 100 has been developed, as shown in FIG. 1. The connector cable 100 is of the type commonly referred to as a "pigtail" and includes a conventional DB9 connector 102 connected to conventional transmit and receive connectors 104 and 106, respectively. The DB9 connector 102 connects through a media interface adapter (not shown) to the fiber optic cable (not shown). The transmit and receive connectors 104 and 106 connect to the storage device (not shown) or to a conventional Fibre Channel "T-Card" (not shown), which connects to the storage device. The media interface adapter converts the optical signal used by the fiber optic cable to the electrical signal used by the connector cable 100. To do so, however, the media interface adapter requires electrical power. Therefore, the connector cable 100 also includes two conventional power connectors 108 and 110, one of which is connected to an electrical power source (not shown). The power connectors 108 and 110 connect to the DB9 connector 102 to supply the electrical power to the media interface adapter. The connector cable 100 is limited to working with only one storage device and is not supported in recent standards set by the Fibre Channel Standards Committee for 2-Gbit/sec transfer rates.

It is with respect to these and other background considerations that the subject matter herein has evolved.

SUMMARY

The subject matter herein involves a new and improved connector cable (sometimes referred to as a "pigtail") for connecting a host computer (e.g. a storage server) through a fiber optic cable to any number of storage devices connected together in a chain-like fashion through the connector cable at the new 2-Gbit/sec rate set by the Fibre Channel Standards Committee. The connector cable also generally includes electrical power connectors for electrical power to support a media interface adapter (MIA) in an environment that provides both wire (e.g. copper, etc.) and optical interconnectivity. With the electrical power, the MIA converts signals that pass therethrough from optical to electrical and vice versa.

The connector cable also generally includes a pass-through mechanism so that any number of the storage devices can be chained together, rather than being limited to the number of storage devices that can be inserted into the backplane of a JBOD. For the pass-through mechanism, in one embodiment, the connector cable includes two transceiver connectors connected together. One of the transceiver connectors is for connecting to the MIA (and thus to the fiber optic cable), and the other transceiver connector is for chaining, or connecting, to a next storage device (possibly through another similar connector cable). Additionally, one of the transceiver connectors is also for connecting to a receiver connector connected to the storage device, and the other transceiver connector is also for connecting to a transmitter connector connected to the storage device. In this manner, a signal from the host computer that comes to the connector cable through the fiber optic cable is passed from the first transceiver connector to the receiver connector and the storage device connected thereto and/or to the second transceiver connector and the next storage device, if any.

In one embodiment, the connector cable preferably uses a conventional HSSDC (High Speed Serial Device Connector) connector, instead of a DB9connector, to connect to the MIA and to pass the electrical power to the MIA, since the HSSDC connector is supported by the new 2-Gbit/sec standards set by the Fibre Channel Standards Committee. In a more particular embodiment, the connector cable uses two of the HSSDC connectors as the two transceiver connectors to enable the pass-through mechanism.

A more complete appreciation of the present disclosure and its scope, and the manner in which it achieves the above noted improvements, can be obtained by reference to the following detailed description of presently preferred embodiments taken in connection with the accompanying drawings, which are briefly summarized below, and the appended claims.

BRIEF DESCRIPTION OF THE DRAWINGS

FIG. 1 is a diagram of a prior art connector cable.

FIG. 2 is a block diagram of a storage system incorporating the present invention.

FIG. 3 is a diagram of a connector cable incorporated in the storage system shown in FIG. 2.

FIG. 4 is a diagram of an additional connector cable incorporated in the storage system shown in FIG. 2.

DETAILED DESCRIPTION

A storage system 200 generally includes a host computer 202 (e.g. a storage server, etc.), and one or more storage enclosures 204, 206, 208 and 210, as shown in FIG. 2. Each storage enclosure 204–210 generally includes a conventional storage device 212 (FIG. 3, described below), such as a hard drive, tape drive, compact disk drive, etc., on which the host computer 202 stores and/or retrieves information. The host computer 202 generally accesses the information in all of the storage enclosures 204–210 by sending an optical signal from a host bus adapter 214 through a fiber optic cable 216 connected to the first storage enclosure 204. The storage enclosures 204–210, however, use electrical signals, rather than optical signals. Therefore, a media interface adapter (MIA) 218 is attached to the first storage enclosure 204 to receive the fiber optic cable 214 and convert the optical signal from the host computer 202 into an electrical signal, and vice versa when sending a response back to the host computer 202. To convert the optical and electrical signals, the MIA 218 uses electrical power received from the first storage enclosure 204, as described below.

Each storage enclosure 204–210 includes conventional transceiver connectors A and B 220 and 222 for transmitting and receiving the signals. The transceiver connector A 220 of each storage enclosure 204–210 is connected directly to the transceiver connector B 222 of the same storage enclosure 204–210 to pass the signals therebetween. The transceiver connector A 220 of the first storage enclosure 204 also connects to the MIA 218 to communicate with the host computer 202. The transceiver connector B 222 of each storage enclosure 204–208 also connects to the transceiver connector A 220 of the next storage enclosure 206–210 through a cable 223 (e.g. copper wires, optical cables, etc.) to form a "chain" of the storage enclosures 204–210. Therefore, the first storage enclosure 204 communicates directly with the host computer 202 through its transceiver connector A 220 to the fiber optic cable 216, whereas the other storage enclosures 206–210 communicate indirectly with the host computer 202 through the transceiver connectors A and B 220 and 222 of the intervening storage enclosures 204–208 in the chain. The number of storage enclosures 204–210 and storage devices 212 (FIG. 3) which can be chained together in this manner is limited only by the physical capabilities of the storage system 200, such as the maximum number of storage devices supported by a conventional Fibre Channel storage system.

An exemplary one of the storage enclosures 204–210 (e.g. 204, see also FIG. 2) generally include the storage device 212, a connector cable 224 and a conventional internal power supply 226. The connector cable 224 includes the transceiver connectors A and B 220 and 222, as well as conventional receiver and transmitter connectors 228 and 230 and conventional power connectors 232 and 234.

Incoming optical signals from the host computer 202 (FIG. 2) pass through the fiber optic cable 216 (FIG. 2) to the MIA 218, where the optical signals are converted to electrical signals. The electrical signals are passed from the MIA 218 to the transceiver connector 220 and then to the receiver connector 228 and/or the transceiver connector B 222 through conventional shielded cables 236 and 238 (e.g. copper wires, etc.), respectively. The electrical signals are passed from the receiver connector 228 to the storage device 212 (e.g. through a conventional Fiber Channel T-Card 240). If any of the received signals are directed to the storage device 212 in the storage enclosure 204, then the storage device 212 sends a response signal through the T-Card 240 to the transmitter connector 230. The response signal passes from the transmitter connector 230 through a conventional shielded cable 242 (e.g. copper wires, etc.) to the transceiver connector 222 through the cable 238 to the transceiver connector A 220. The transceiver connector A 220 passes the response signal, an electrical signal, to the MIA 218, which converts the response signal into an optical signal for transmission back through the fiber optic cable 216 to the host computer 202.

By using the shielded cables 236, 238 and 242, the connector cable 224 is not as susceptible to interference difficulties, as is the backplane described in the background. Also, since the connector cable 224 can chain almost any number of the storage enclosures 204–210 together, the storage system 200 is not limited to a given number of storage devices, as is the backplane. Thus, the connector cable 224 enables greater flexibility in configuring the storage system 200 and connecting the storage enclosures 204–210 together.

If the received signals are not directed to the storage device 212 of the storage enclosure 204, then the storage device 212 ignores the received signals. Meanwhile, the received signals pass from the transceiver connector B 222 through the cable 223 (FIG. 2) to the transceiver connector A 220 of the next storage enclosure 206 (FIG. 2), where essentially the same procedure occurs for the storage device 212 in the storage enclosure 206 to respond to the received signals or for the received signals to be passed to the next storage enclosure 208 (FIG. 2) and so on. If the cables 223 are optical, instead of copper or other electrical conductor, however, then additional MIA's 218 must be connected to each of the transceiver connectors A and B 220 and 222 of each of the storage enclosures 204–210 to interface between the transceiver connectors A and B 220 and 222 and the optical cables 223. Additionally, each storage enclosure 204–206 must include the power supply 226, and the electrical power must be supplied from the power supply 226 to the transceiver connectors A and B 220 and 222 to power the additional MIA's 218.

When the storage device 212 in one of the subsequent storage enclosures 206–210 (FIG. 2) responds to any of the received signals, then the response signal is passed from the transmitter connector 230 through the cable 242 to the transceiver connector B 222 through the cable 238 to the transceiver connector A 220 of the responding storage enclosure 206–210. Then the response signal is passed from the transceiver connector A 220 of each storage enclosure 206–210 through the cables 223 to the transceiver connector B 222 of the next storage enclosure 204–208 (and through the cable 238 to the transceiver connector A 220 therein) until reaching the transceiver connector A 220 of the first storage enclosure 204 and the MIA 218 connected thereto.

The storage enclosures 204–210 may not include the power supply 226 if it is not needed, i.e. an MIA is not connected to the storage enclosure 204–210. Whether internal or external, however, since the storage enclosure 204 has the transceiver connector A 220 connected to the MIA 218, the storage enclosure 204 preferably supplies electrical power to the MIA 218 for the MIA 218 to convert the optical signals received through the fiber optic cable 216 into the electrical signals used inside the storage enclosures 204–210 and vice versa. Therefore, the T-Card 240 (and thus the storage device 212) connects to one of the power connectors 232, the power supply 226 connects to the other power connector 234 (e.g. through a power cable 244 and a power connector 246), and the power connectors 232 and 234 are connected together by a power cable 248, so that electrical power is supplied from the power supply 226 to the T-Card 240 and the storage device 212. Additionally, one of the power connectors 232 or 234 (e.g. 232) is connected through another power cable 250 to the transceiver connector 220, so that electrical power is supplied from the power supply 226 to the MIA 218 connected thereto.

For those storage enclosures 206–210 (FIG. 2) that do not have an MIA 218 (FIGS. 2 and 3) connected thereto, it is not necessary to connect the power supply 226 to the transceiver connector 220. Therefore, the connector cable 252, as shown in FIG. 4, may be used in place of the connector cable 224 (FIG. 3) in the storage enclosures 206–210 after the first storage enclosure 204 (FIGS. 2 and 3). The connector cable 252 generally includes only the transceiver connectors A and B 220 and 222, the receiver and transmitter connectors 228 and 230 and the cables 236, 238 and 242 and not the power connectors 232 and 234 (FIG. 3) or power cables 248 and 250 (FIG. 3). Alternatively, the connector cable 224 may be used in the storage enclosures 206–210 with the power connectors 232 and 234 unconnected to anything or connected and not used if the MIA 218 is not connected to the storage enclosure 206–210.

In an alternative embodiment, the connector cable 224 (FIG. 3) is incorporated into a printed circuit board (PCB) (not shown). In this case, the connectors 220, 222, 228 and 230 (FIG. 3) are mounted onto the PCB, and the cables 236, 238 and 242 (FIG. 3) are formed as traces on the PCB. In another embodiment, the connector cable 224 is incorporated into the Fibre Channel T-Card 240 (FIG. 3). This embodiment is similar to the PCB embodiment, except that the receiver and transmitter connectors 228 and 230 may not be included, since they aren't needed to connect to the T-Card 240.

In a particular alternative embodiment, the transceiver connectors A and B 220 and 222 (FIG. 3) are standard HSSDC or HSSDC-2 connectors. These connectors are supported by the standards set by the Fibre Channel Standards Committee for 2-Gbit/sec transfer rates, so the connector cable 224 (FIG. 3) can operate at higher transfer rates than can the connector cable 100 (FIG. 1) described in the prior art.

Presently preferred embodiments of the subject matter herein and its improvements have been described with a degree of particularity. This description has been made by way of preferred example. It should be understood that the scope of the claimed subject matter is defined by the following claims, and should not be unnecessarily limited by the detailed description of the preferred embodiments set forth above.

What is claimed is:

1. A connector cable for connecting together a first storage device, a power supply and an optical cable comprising:

first and second transceiver connectors connected together to transfer signals therebetween, the first transceiver connector being for connecting to the optical cable to transfer the signals therewith, the second transceiver connector being for connecting to an optional second storage device to transfer the signals therewith;

a receiver connector connected to the first transceiver connector and the first storage device to transfer the signals to the first storage device from the first transceiver connector;

a transmitter connector connected to the second transceiver connector and the first storage device to transfer the signals from the first storage device to the second transceiver connector; and first and second power connectors connected together and to the first transceiver connector to transmit electrical power thereto, the first power connector being for connecting to the power supply to receive the electrical power therefrom, the second power connector being for connecting to the storage device to transmit the electrical power thereto;

and wherein:

incoming signals that are directed to the first storage device are received by the first storage device from the optical cable through the first transceiver connector and the receiver connector;

response signals from the first storage device are sent through the transmitter connector, the second transceiver connector and the first transceiver connector to the optical cable; and incoming signals that are directed to the second storage device are received by the second storage device from the optical cable through the first transceiver connector and the second transceiver connector.

2. A connector cable as defined in claim 1 wherein:
   the first transceiver connector is for connecting to a media interface adapter, which interfaces between the optical cable and the connector cable.

3. A connector cable as defined in claim 2 wherein:
   the optical cable transfers optical signals to the media interface adapter;
   the first transceiver connector transfers electrical signals to the receiver connector and the first storage device;
   the electrical power received from the power supply is transmitted through the first transceiver connector to the media interface adapter; and
   the media interface adapter uses the electrical power to convert the optical signals to the electrical signals.

4. A connector cable as defined in claim 1 wherein:
   the second transceiver connector is for connecting to the second storage device through a next first transceiver connector of a next connector cable.

5. A connector cable as defined in claim 1 wherein:
   the first and second transceiver connectors comprise HSSDC connectors.

6. A computerized storage system comprising:
   a host device;
   a plurality of storage devices connected together for storing information on behalf of the host device;
   an optical cable connecting the host device to the storage devices and through which optical signals are transferred between the host device and the storage devices;
   a plurality of connector cables, each corresponding to one of the storage devices and having first and second transceiver connectors connected together and at least one storage device connector connected to the first and second transceiver connectors and to the corresponding storage device for transferring electrical signals to and from the storage device, the connector cables forming a chain of the storage devices in which the second transceiver connector of each of the connector cables, except for a last one of the connector cables corresponding to a last one of the storage devices in the chain, is connected to the first transceiver connector of a subsequent one of the connector cables corresponding to a subsequent one of the storage devices in the chain;
   at least one power supply connected to the first transceiver connector of a first one of the connector cables for supplying electrical power to the first transceiver connector connected thereto; and
   a media interface adapter connected between the first transceiver connector of the first connector cable and the optical cable, receiving the electrical power supplied to the first transceiver connector and using the electrical power to convert the optical signals into the electrical signals.

7. A computerized storage system as defined in claim 6 wherein:
   for each connector cable, the at least one storage device connector includes a receiver connector connected to the first transceiver connector and the corresponding storage device to transfer the electrical signals from the first transceiver connector to the corresponding storage device and a transmitter connector connected to the second transceiver connector and the corresponding storage device to transfer the electrical signals from the corresponding storage device through the second transceiver connector to the first transceiver connector.

8. A connector cable as defined in claim 6 wherein:
   the first and second transceiver connectors comprise HSSDC connectors.

9. A method for transferring signals between a host device and a plurality of storage devices, the storage devices being connected together in a chain by a plurality of connector cables, each connector cable corresponding to one of the storage devices and having first and second transceiver connectors connected together, a receiver connector connected to the first transceiver connector and the corresponding storage device, a transmitter connector connected to the second transceiver connector and to the corresponding storage device, the first transceiver connector of a first one of the connector cables also connecting to a power supply and to a media interface adapter, the media interface adapter connecting to the host device, each connector cable also connecting to a subsequent one of the connector cables in the chain, except for a last one of the connector cables in the chain, comprising:

- sending a first optical signal from the host device to the media interface adapter connected to the first connector cable;
- supplying electrical power from the power supply to the media interface adapter through the first transceiver connector;
- using the electrical power to convert the first optical signal to a first electrical signal by the media interface adapter;
- transferring the first electrical signal from the media interface adapter through the first transceiver connector and the receiver connector to a first one of the storage devices;
- if the first electrical signal is directed to the first storage device, transferring a second electrical signal from the first storage device through the transmitter connector, the second transceiver connector and the first transceiver connector to the media interface adapter;
- using the electrical power to convert the second electrical signal to a second optical signal by the media interface adapter; and
- sending the second optical signal from the media interface adapter to the host device.

10. A method as defined in claim 9, wherein the second transceiver connector of each connector cable, except for the last connector cable, connects to the first transceiver connector of the subsequent connector cable, further comprising:

- transferring the first electrical signal from the media interface adapter through the first and second transceiver connectors of the first connector cable and the first transceiver connector and the receiver connector of a second one of the connector cables to a second one of the storage devices;
- if the first electrical signal is directed to the second storage device, transferring a third electrical signal from the second storage device through the transmitter connector, the second transceiver connector and the first transceiver connector of the second connector cable and the second transceiver connector and the first transceiver connector of the first connector cable to the media interface adapter;
- using the electrical power to convert the third electrical signal to a third optical signal by the media interface adapter; and
- sending the third optical signal from the media interface adapter to the host device.

\* \* \* \* \*